United States Patent [19]

Ogasawara

[11] Patent Number: 5,153,630
[45] Date of Patent: Oct. 6, 1992

[54] AUTO FOCUS CONTROLLING SYSTEM

[75] Inventor: Akira Ogasawara, Kawasaki, Japan

[73] Assignee: Nikon Corporation, Tokyo, Japan

[21] Appl. No.: 833,821

[22] Filed: Feb. 12, 1992

Related U.S. Application Data

[63] Continuation of Ser. No. 439,801, Nov. 21, 1989, abandoned.

[30] Foreign Application Priority Data

Nov. 28, 1988 [JP]  Japan ................. 63-300313

[51] Int. Cl.$^5$ ............................................. G03B 13/36
[52] U.S. Cl. ..................... 354/402; 354/400; 354/408
[58] Field of Search .......... 354/400, 402, 195.1, 354/408, 409

[56] References Cited

U.S. PATENT DOCUMENTS

| | | | |
|---|---|---|---|
| 4,447,719 | 5/1984 | Ogasawara | 354/409 |
| 4,506,150 | 3/1985 | Ogasawara | 354/402 |
| 4,613,224 | 9/1986 | Ogasawara | 354/402 |
| 4,762,986 | 8/1988 | Suda et al. | 354/402 |
| 4,772,909 | 9/1988 | Ogasawara | 354/400 |
| 4,792,821 | 12/1988 | Akashi | 354/402 |
| 4,812,636 | 3/1989 | Kusaka et al. | 354/408 |
| 4,912,496 | 3/1990 | Tamada et al. | 354/402 |

Primary Examiner—Russell E. Adams
Attorney, Agent, or Firm—Shapiro and Shapiro

[57] ABSTRACT

A dynamic servo-controlled auto-focusing system for a camera lens, in which range finding and lens driving operations overlap, comprises a light receiving element or a charge storage sensor, a computing element for computing defocus information corresponding to a positional relation between a subject image and a predetermined plane by processing output data of the light receiving element, a driving element for servoing the camera lens to a focused position according to information from the computing element, and a lens movement detecting element for detecting movement of the camera lens in real time. In a preferred mode of operation, the equivalent lens position for the range finding portion of each cycle is determined on a time-weighted mean basis. At the completion of each cycle, the current position of the driven lens relative to the equivalent position during range finding is determined, and the difference is applied to the defocus amount corresponding to the equivalent position, thereby to obtain a corrected defocus amount corresponding to the current position of the lens. The lens is then driven according to the corrected defocus amount in the next servo cycle.

14 Claims, 5 Drawing Sheets

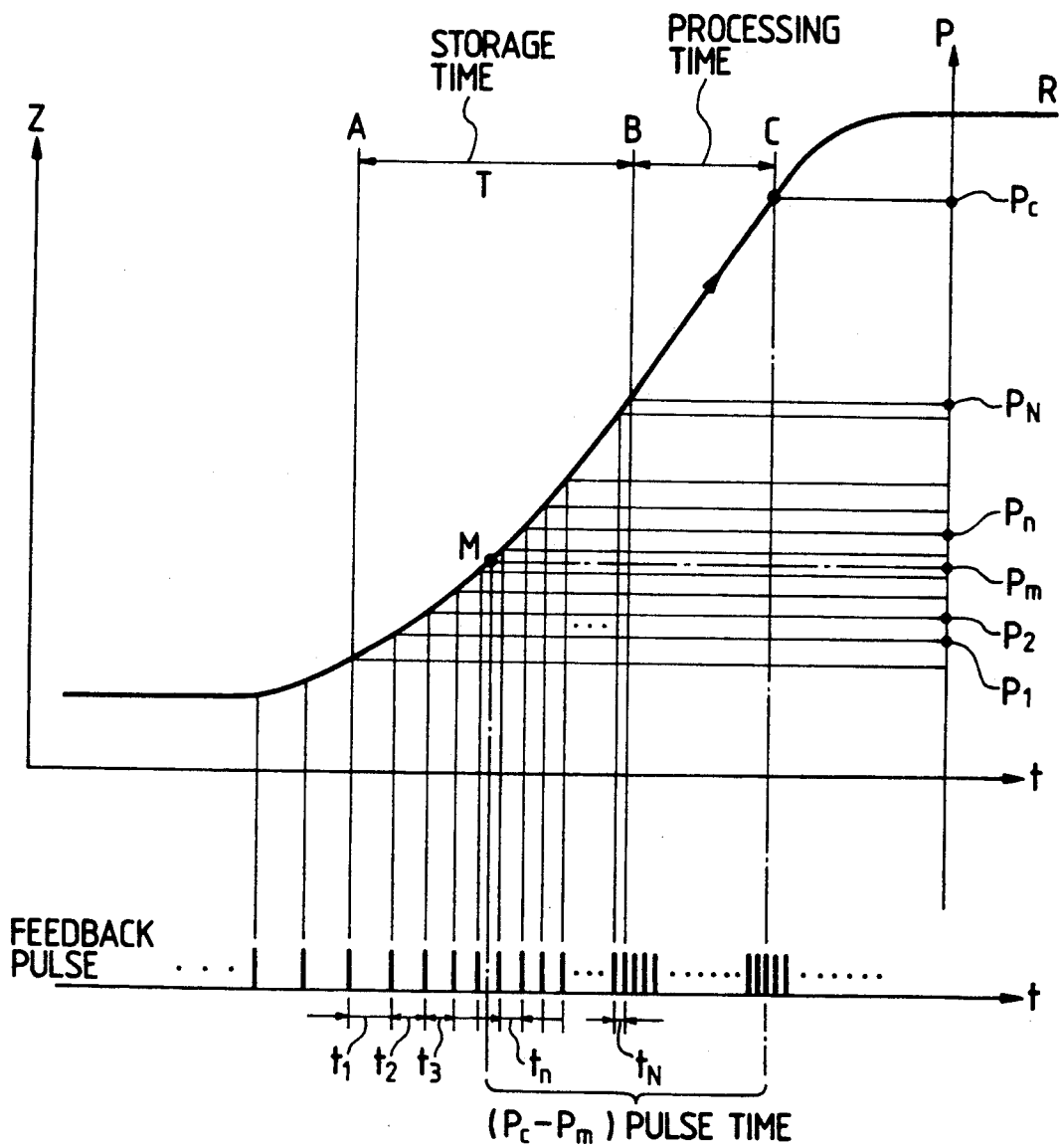

AUTO FOCUS CONTROLLING SYSTEM

This is a continuation of application Ser. No. 439,801 filed Nov. 21, 1989, now abandoned.

BACKGROUND OF THE INVENTION

1. Field of the Invention

The present invention relates to a TTL auto focus controlling system, and is particularly concerned with an auto focus controlling system operating for focus control as computing new focused positions successively according to accumulating operation of a charge storage sensor while driving a camera lens to focused positions.

2. Related Background Art

Known hitherto is such type of the auto focus controlling system wherein a camera lens is driven by motor. A luminous flux, from an object to be photographed is passed through the camera lens and is imaged on a light receiving element such as a CCD which is provided within a camera body to detect the amount of defocus, and focusing is then controlled through the focused state.

Generally, such auto focus controlling system operates for "range finding" to detect a focused state of optical system, and "lens drive" to drive a camera lens according to a result of range finding. The case where the focusing operation is complete in one cycle of "range finding" and "lens drive" may involve no problem. However, if the amount of defocus becomes appreciably large, the range finding becomes short of precision, as that "range finding" and "lens drive" must be repeated after the lens is driven once. In case the object moves continuously, "range finding" and "lens drive" must also be repeated so as to keep focusing dynamically after the subject.

In such case, a response efficiency of the system may be enhanced from overlapping range finding and lens drive in time. However, in the auto focus controlling system using a charge storage sensor such as CCD or the like as a light receiving element, a storage time according to an intensity of light is required for converting an optical image on the sensor into photoelectricity and thus obtaining a video signal having a proper S/N ratio. If a range finding is carried out while a camera lens is driven, a light intensity distribution on the sensor changes during the storage time due to a drive of the camera lens. Therefore it cannot be estimated with precision whether or not the amount of defocus obtainable from processing a sensor output after the storage is over through a predetermined time is equivalent to a particular lens position through which the camera lens is driven.

Thus, as the sequence for servoing the camera lens for the auto focus control, a cycle wherein the range finding is done as keeping the camera lens still, and the camera lens is then driven according to a result of range finding is repeated as mentioned hereinbefore. Or, in case the lens drive is effected during the sensor storage period, the obtained amount of defocus is corrected on the assumption that the camera lens moves at uniform velocity at least during the sensor storage period, and that the obtained amount of defocus thus corresponds to a camera lens position midway between the lens positions at the start and end of the storage period. The next servo drive is then carried out.

With the axis of ordinate as indicating a lens position Z and the axis of abscissa as indicating a time t, FIG. 5 represents a prior art method wherein a range finding and lens drive are repeated alternately in drive and stop fashion in an autofocus servo system, showing a mode wherein a camera lens is driven to a focused position ($Z=0$). In the drawing, the sensor is accumulating at times indicated by oblique lines for computing the amount of defocus. FIG. 6 is a flowchart indicating a sequence wherein range finding and lens drive of FIG. 5 are repeated alternately. FIG. 7 is an explanatory drawing of a lens drive when range finding and lens drive are overlapped and a moving rate of the camera lens during accumulation of the sensor is assumed constant.

As illustrated in FIG. 7, if the lens moving rate is constant during sensor storage times (times for range finding) T1, T2, T3, then range finding positions corresponding to a range finding result (amount of defocus) obtained through the storage times T1, T2, T3 are P1, P2, P3 respectively, these being equivalent to midpoints of the storage times T1, T2, T3.

The FIG. 7 scheme is problematic as a practical matter, because the assumption of a constant lens moving rate often does not hold. For example, the rate of lens movement will change when a driving motor is started and braked, or a driving rate is modified. Moreover, even when the lens is subjected to a steady drive, if a mechanical design and a fabrication are not satisfactory, then a motor load varies considerably according to a position of the lens, and thus a constant rate of the motor cannot be so assumed in most cases. Therefore, a lens move corresponding to the amount of defocus cannot be corrected so precisely as might be expected.

FIG. 8 represents the case where a lens driven speed is not constant during the period of time for accumulating operation of the sensor (operation for range finding), again indicated by oblique lines. As will be appreciated from the preceding discussion of FIG. 7, the method for correcting the amount of defocus on the assumption that the lens driven speed is constant is not satisfactory in the case represented by FIG. 8.

SUMMARY OF THE INVENTION

The invention has been devised in view of such problems inherent in the prior art methodology, and its object is to provide a method for controlling an automatic focusing control system whereby a high focusing precision is obtainable through computing the amount of defocus of a driven lens accurately.

To attain the aforementioned object, the automatic focusing control system according to the invention is provided with a light receiving element comprising a charge storage sensor, computing means for computing defocus information corresponding to a positional relation between a subject image by a camera lens and a predetermined plane through processing output data of the light receiving element, driving means for servoing the camera lens to a focused position according to defocus information of the computing means and lens movement detecting means for detecting movement of the camera lens in real time. The system performs a control operation through the following steps:

STEP 1

While the camera lens is driven toward a focused position, an accumulating operation is done on the light receiving means for a predetermined period of time, and after the accumulation is over, a new amount of defocus is computed by the computing means.

STEP 2

An equivalent lens position (Pm) within the storage time corresponding to the defocus computation according to STEP 1 is computed as the sum total of a value (Pn·tn/T), obtained through multiplying a time ratio (tn/T) of a moving time (tn) per unit move of the camera lens to a total storage time (T) by a lens position (Pn) at every unit move.

STEP 3

A corrected amount of defocus is obtained by subtracting from the amount of defocus obtained at STEP 1 a value obtained through deducting the aforementioned equivalent camera lens position from a camera lens position at the point in time when the amount of defocus after the end of accumulation is computed.

STEP 4

The corrected amount of defocus obtained as above is then used to control the driving means, and the cycle is repeated such that the camera lens is servoed to a focused position.

In such dynamic focusing control system according to the invention, an equivalent position of the camera lens during the storage time is computed on a time-weighted means basis. Consequently, according to the invention, a position of the camera lens corresponding to an amount of defocus obtained when overlapping range finding with the lens drive is determined accurately. Thus, the invention makes it possible to correct the result of range finding (i.e., the amount of defocus) at high precision as compared with the prior art.

Other objects, features and advantages of the present invention will be more apparent in the following detailed description taken in connection with the accompanying drawings.

BRIEF DESCRIPTION OF THE DRAWINGS

FIG. 3 is an explanatory drawing showing a state wherein a lens is driven to a focused position, illustrating a principle of computing an equivalent position of the lens in the example given in FIG. 1.

DETAILED DESCRIPTION OF PREFERRED EMBODIMENTS

Operative examples of the invention will now be described in detail with reference to the accompanying drawings.

Figure 1:
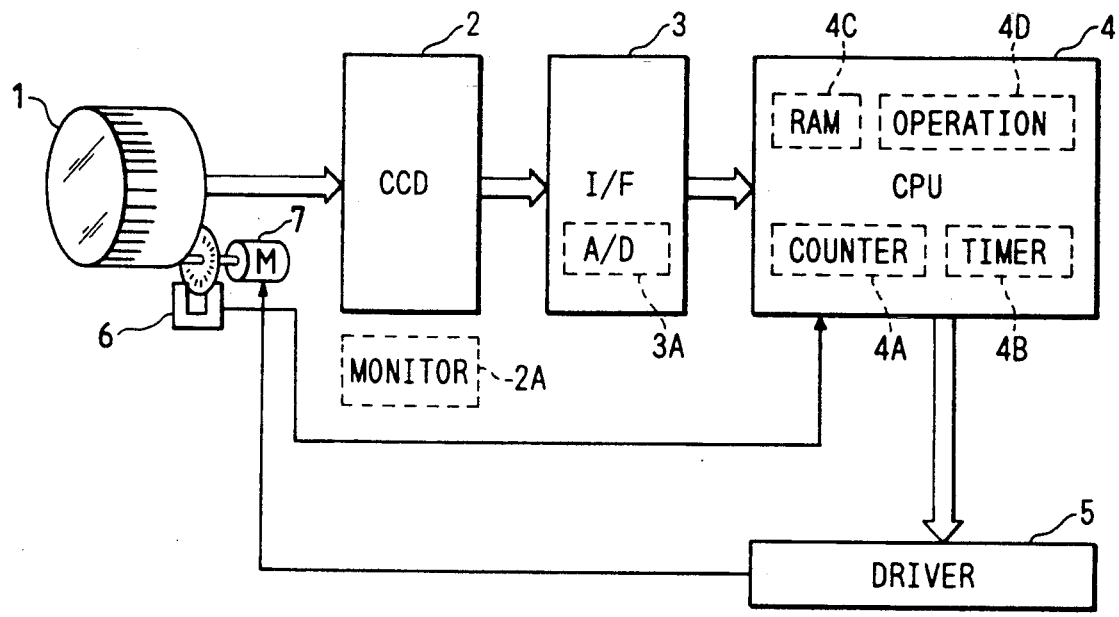
FIG. 1 is a block diagram showing a schematic construction of a control system embodying the invention.

FIG. 1 is a block diagram showing a schematic construction of an auto focus controlling system embodying the invention, wherein a camera lens is driven by a motor to servo to a focused state.

In FIG. 1, light from the object having passed through a lens 1 is imaged on a light receiving sensor 2 provided in a camera body as light receiving means, and a signal from the light receiving sensor 2 is sent through an interface 3 to a controller 4 for controlling the system a charge storage type light receiving element such as CCD or the like is used for the light receiving sensor 2, and a microprocessor is used for the controller 4. The microprocessor, called microcomputer otherwise, is called "CPU" for simplicity hereinafter.

A light intensity distribution on the light receiving sensor 2 is subjected to AD conversion in the interface 3 and outputted to CPU 4, or is amplified to a proper signal level in the interface 3 and subjected to AD conversion.

The light intensity distribution converted thus into a digital signal is processed by CPU 4 according to a predetermined AF (auto focus) algorithm, and a move of the camera lens necessary for a focused state to obtain is computed. Since the lens move is equivalent to an amount of defocus which will be described later, it is called "amount of defocus" hereinafter. There are many known examples of optical systems and algorithms for detecting the amount of defocus. Therefore, further description will be omitted here.

The camera lens 1 is provided with an encoder 6 for monitoring its movement, and the encoder 6 generates a pulse (called "feedback pulse" hereinafter) whenever the camera lens 1 moves by a predetermined amount along an optical axis. CPU 4 instructs a motor driver 5 in accordance with a computed amount of defocus (lens move) to drive a servomotor 7, thus driving the camera lens 1 in the direction of focusing. Movement of the camera lens 1 is monitored by CPU 4 based on feedback pulses from the encoder 6, and the CPU stops driving upon counting the feedback pulses from the encoder 6 by the number corresponding to the amount of defocus.

The encoder 6 has a photointerrupter provided on a rotating shaft of the motor 7 and one part of a reduction gear so as to detect rotations of the camera lens driving servomotor 7.

Figure 2:
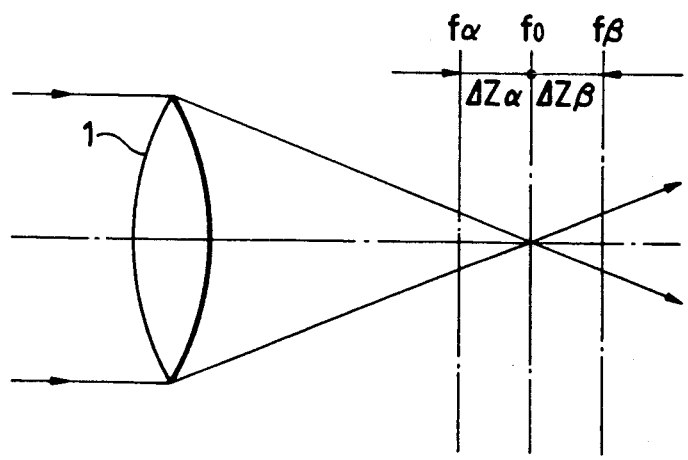
FIG. 2 is an explanatory drawing of an amount of defocus.

FIG. 2 is an explanatory drawing of the amount of defocus detected by the dynamic focusing control system.

In FIG. 2, the amount of defocus is defined as a distance between a film plane and a surface at which a luminous flux passed through the lens 1 is imaged, i.e. an out-of-focus amount $\Delta Z$. The image surface of the camera lens 1 coming on a film plane $f_0$ indicates a focused state, the image surface coming on a position $f\alpha$ forward of $f_0$ (leftward in FIG. 2) indicates a so-called forward-focused state, and the image surface coming on a position $f\beta$ rearward of $f_0$ (rightward in FIG. 2) indicates a so-called rearward-focused state.

As will be apparent from FIG. 2, if a subject is present relatively far away, the amount $\Delta Z$ and the lens movement necessary for focusing are almost equal. Accordingly, to image (focus) the subject image on the film plane, the camera lens 1 may be driven longitudinally by an amount of defocus $\Delta Z\alpha$ at the time of forward-focused state, or by an amount of defocus $\Delta Z\beta$ at the time of rearward-focused state. When a focal distance comes near (subject near), the amount of defocus $\Delta Z$ and the lens movement to focus do not coincide precisely. However, it is taken that both the two are equal in the description given henceforeward.

With reference to FIG. 3, a method wherein a range finding is performed while the lens is driven according to a control method of the system embodying the invention will now be discussed.

FIG. 3 shows a mode wherein the camera lens is servoed and driven by a motor so as to focus on a subject, the axis of ordinate indicating a camera lens position Z, the axis of abscissa indicating a time t, the curve R indicating a moving path of the camera lens 1. Feedback pulses generated through monitoring movement of the camera lens 1 while the camera lens 1 is driven are indicated on a lower axis showing the time base t.

Now, in FIG. 3, assuming that a storage start time of the charge storage sensor (hereinafter called "AF sensor") 2 or a light receiving element during a drive of the camera lens 1 is A, and a storage end time is B, the AF sensor 2 stores a charge corresponding to the light intensity distribution on a sensor light receiving surface for a storage time T continuously from the time A to the time B. During storage in the AF sensor 2, the light intensity distribution on the sensor light receiving surface will change continuously with movement of the camera lens. In the invention, sum total of charges stored correspondingly to each still light intensity distribution in each interval of feedback pulse generation approximates to an output of the AF sensor. A change of light intensity distribution during the period of such generation interval of the feedback pulses is very little, so that such approximation will not involve a problem in result.

Further, if pulse count values on a side of servo circuit, or CPU 4 indicated in FIG. 1 at positions where each feedback pulse is generated are P1, P2, P3, ... Pn, then these pulse count values indicate lens positions relative to that corresponding to the pulse count value=0 as a reference. Hence in FIG. 3, the pulse count value P (P base coordinate value) is indicated on the right axis of ordinate.

Normally, when the amount of defocus ΔZ is computed according to a new range finding data and a servo desired pulse number corresponding to the amount of defocus is updated, a pulse counter 4A of CPU 4 monitoring the lens movement amount is cleared to zero, and a new desired movement amount is set to keep a servo drive on. Therefore the pulse count values in servo such as P1, P2, ... indicate positions of the camera lens 1 (lens coordinate positions) measured in the direction of servo (moving direction) with the position whereat servo is started immediately before as a reference. Accordingly, in the description given hereunder, the pulse count value Pn is called (relative) position Pn.

Further, as shown in FIG. 3, pulse periods from the charge storage start A of the AF sensor 2 by the encoder 6 are denoted by t1, t2, t3, ..., tn, ... tN in that order. Times are stored on a timer 4B in CPU 4 whenever the feedback pulse is generated, and the pulse periods are obtainable through deducting a previous pulse time from the storage time.

Consequently, the (relative) position Pn of the camera lens 1, and the elapsed time tn from the previous pulse, i.e. the pulse period, are found whenever a feedback pulse is obtained.

Accordingly, taking that the ratio of a quantity of light stored at the position Pn to a total quantity of light stored in the AF sensor 2 covering the storage time T is a ratio of the storage time (tn/T), then (Pn·tn/T) represents the position Pn with the ratio of the quantity of light stored at the position Pn to the total quantity of light stored as a weighting. Thus, a position Pm given by:

$$Pm = \Sigma Pn \cdot tn / T \qquad (1)$$

indicates a mean lens position for the total quantity of light received on the AF sensor 2. The position Pm is defined as an equivalent camera lens position in the invention.

The equation (1) for obtaining the equivalent camera lens position Pm directly expresses a time-weighted, or a timed mean position of the lens. However, considering that the quantity of light received by the AF sensor 2 is proportional to the storage time, Pm may indicate a mean position of the camera lens 1 with the quantity of light received as a weighting, or a mean light receiving position as a pulse count.

Thus the equivalent camera lens position Pm computed according to Eq. (1) is obtained through the algorithm for computing the amount of defocus from a total received light output of the AF sensor 2, and while not strictly coincident with a lens position corresponding to the final amount of defocus, it may be regarded as almost equal practically thereto. More particularly, the mean light receiving position obtained as above will be almost equal to a lens position corresponding to a computed result of the final defocus in consideration of a general property that a magnitude of the quantity of light received at each position of the lens may determine a degree of contribution to a computed result of the final defocus at the lens position.

A predetermined processing time is necessary until the amount of defocus and equivalent camera lens position Pm are computed from a stored charge of the AF sensor 2. Accordingly, a lens movement from the equivalent camera lens position is obtainable through reading a feedback pulse count Pc at the point in time when the predetermined processing time is over, or immediately before starting the next servo, and deducting the pulse count Pm at the computed equivalent camera lens position. In the case of FIG. 3, this would be the pulse number (Pc−Pm) during the period from an equivalent camera lens position M to the time C whereat a computation of the amount of defocus is over. Accordingly, if the value obtained from converting the computed amount of defocus into the pulse number is Ps1, and the next servo desired pulse number having a lens movement from the equivalent camera lens position M corrected to Ps1 is Ps2, then Ps2 is obtainable as:

$$Ps2 = Ps1 - (Pc - Pm) \qquad (2)$$

a code for obtaining Ps2 is determined subject to the counter 4A for counting feedback pulses being an up-count type whereby the count value is incremented as a pulse is inputted.

Figure 4A:
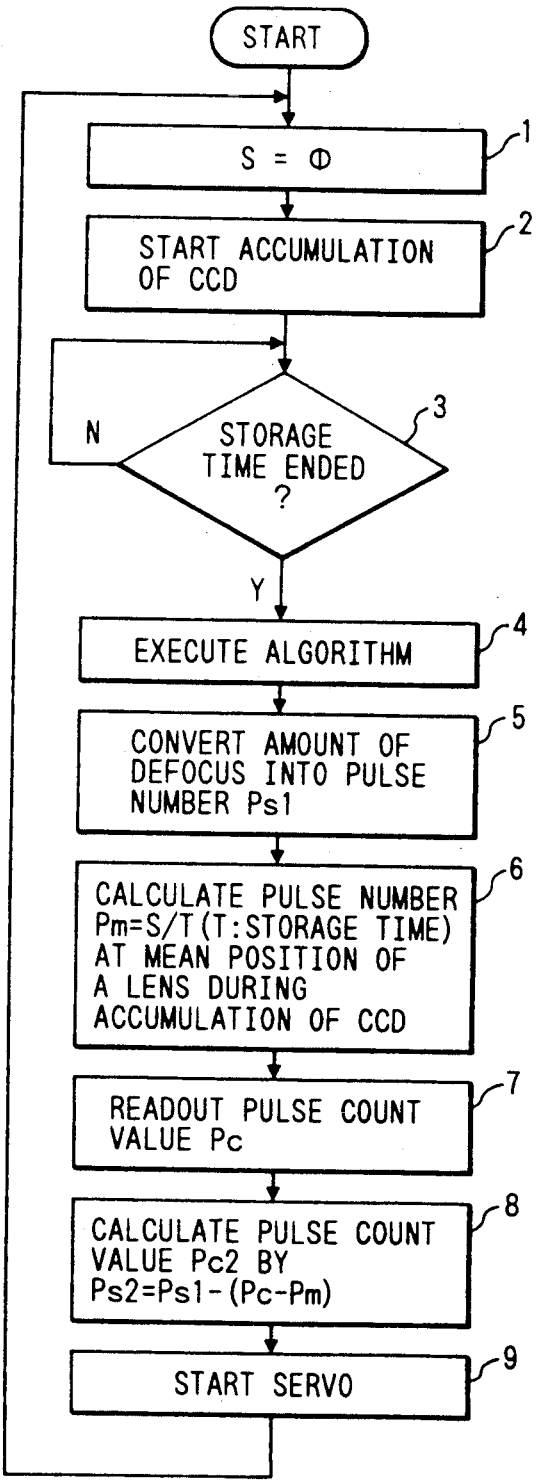
FIG. 4A and FIG. 4B are flowcharts indicating a focusing control operation of the control system according to the invention, wherein FIG. 4A refers to a main routine and FIG. 4B refers to an interruption routine run whenever a feedback pulse is generated.
Figure 4B:
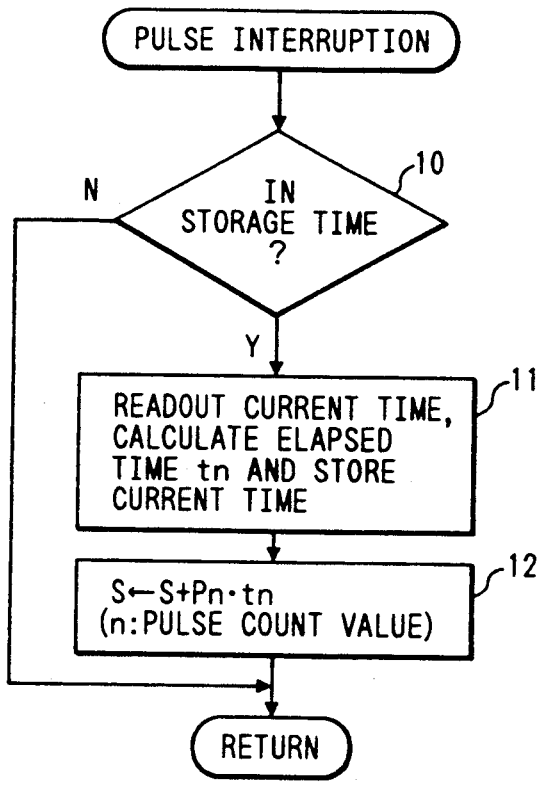
Figure 5:
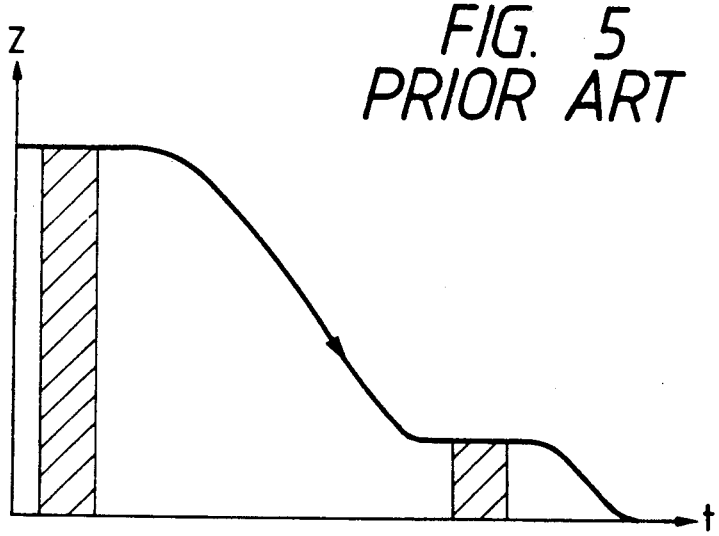
FIG. 5 is an explanatory drawing illustrating a range finding and a lens drive in a static state according to a prior art.
Figure 7:
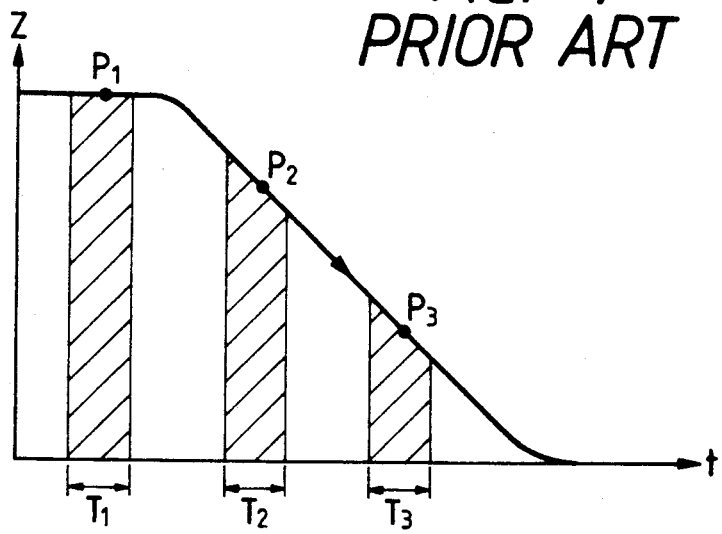
FIG. 7 is an explanatory drawing of a prior art servo control by overlapping range finding and lens drive with the lens moving rate as constant.
Figure 8:
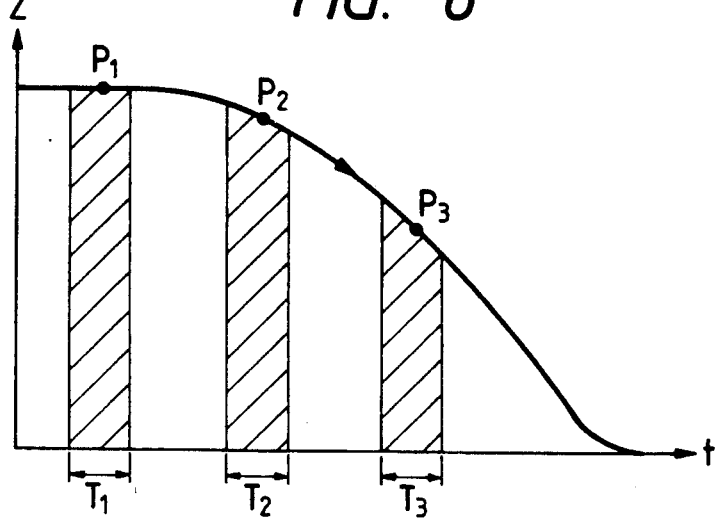
FIG. 8 is an explanatory drawing of a servo control overlapping range finding and lens drive when a lens is accelerated and decelerated.
Figure 6:
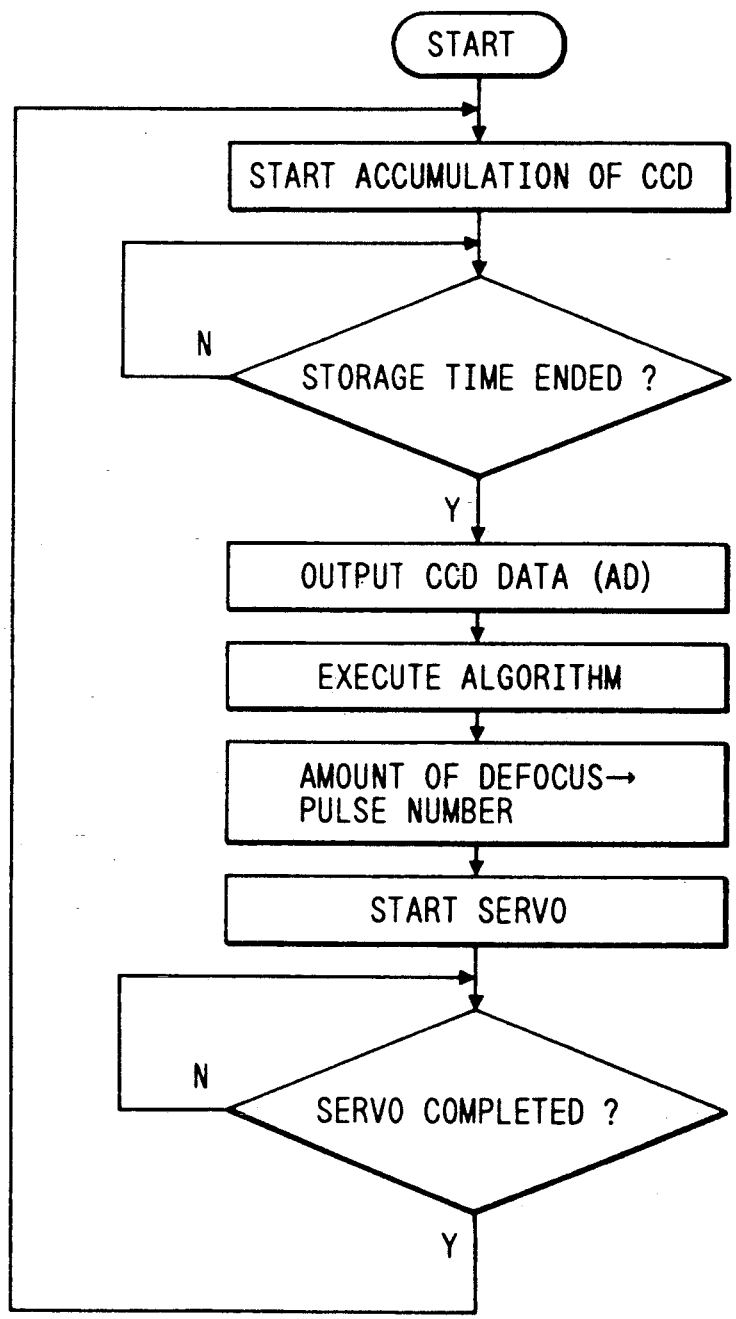
FIG. 6 is a flowchart indicating a control operation according to the focusing control method in FIG. 5.

FIG. 4A and FIG. 4B are flowcharts indicating a control method of the automatic focusing control system according to the invention, i.e. the control method effective by overlapping a storage of AF sensor and a lens drive. The flowcharts refer to a main routine of FIG. 4A and an interruption routine of FIG. 4B which is run whenever the feedback pulse shown therein is outputted.

In FIG. 4A, after a buffer S is cleared at STEP 1, a storage operation of the AF sensor 2 is commenced at STEP 2. Then, the storage for a proper predetermined time is performed according to an intensity of the quantity of light received at STEP 3. For detection of an end of the storage at STEP 3, a separate sensor 2A for monitoring the quantity of light is provided on the AF sensor 2, and an output of the monitoring sensor is detected. Alternatively the timer 4B is set so as to have a proper storage time estimated from the previous output level of AF sensor. The former is called hard AGC, and the latter is called soft AGC.

Accordingly, when a storage end is detected by hard AGC or soft AGC, a read operation of the AF sensor is carried out, and an output of AF sensor is subjected to AD conversion by AD converter 3A in the interface 3 and loaded in RAM 4C in the CPU 4.

The at step 4, arithmetic means 4D of the CPU 4 computes the amount of defocus using data loaded in RAM 4C according to a predetermined algorithm, and the computed amount of defocus is converted into the pulse number Ps1 corresponding thereto at STEP 5.

On the other hand, during the storage time at STEP 3, an interruption routine of FIG. 4B is run whenever the feedback pulse generated from the encoder 6 is obtained as the camera lens 1 is moved.

In the interruption routine of FIG. 4B, if the storage time is in progress at STEP 10, then an elapsed time tn from the previous pulse is computed at STEP 11. Then, after the elapsed time tn from the previous pulse is computed, the time whereat a current pulse is generated is stored for the next interruption.

Next at STEP 12, the count value Pn of the feedback pulse which is already obtained is multiplied by the elapsed time tn obtained at STEP 11, which is added to the buffer S cleared at STEP 1 of FIG. 4A. Accordingly, ($\Sigma Pn \cdot tn$) is stored in the buffer S when charge storage of the AF sensor 2 is over.

Referring again to FIG. 4A, at STEP 6 a value of the buffer S obtained by the interruption routine of FIG. 4B, i.e. $S = \Sigma Pn \cdot tn$, is divided by the storage time T, thus computing the equivalent camera lens position Pm. Then at STEP 7, the count value Pc of the feedback pulse at the time (time C in FIG. 3) when the equivalent camera lens position Pm is computed at STEP 6 is read.

At STEP 8 next, $$Ps2 = Ps1 - (Pc - Pm)$$

is computed according to the pulse number Ps1 into which the amount of defocus computed at STEP 5 is converted, the count value Pc read out at STEP 7, and the equivalent camera lens position Pm computed at STEP 6. The next servo desired pulse number Ps2 is obtained, and finally a servo drive according to the servo desired pulse number Ps2 is commenced at STEP 9.

When the processing from STEP 1 to STEP 9 is once over while the camera lens 1 is driven toward a focused position, a similar servo cycle is repeated from STEP 1 until the camera lens 1 comes to reach the focused position.

As will be appreciated from the preceding description, by accurately determining the equivalent position of a driven lens during range finding (i.e., during the charge storage period of the light receiving element) in each servo cycle, the invention achieves a high speed dynamic auto-focusing system having high precision.

I claim:

1. A focusing control system for a camera lens, comprising:

charge storage type light receiving means for receiving light from an object through said camera lens, and for generating a photoelectric signal according to an intensity distribution of the light received during a period of charge storage of said light receiving means;

computing means operative after the period of charge storage of said light receiving means is over for computing a defocus amount representing a positional relation between an image of the object by said camera lens and a predetermined plane according to said photoelectric signal;

controlling means for operating said light receiving means and said computing means repeatedly;

driving means for driving said camera lens during at least a part of the period of charge storage of said light receiving means;

means for generating a position signal having a value indicating a position of the camera lens with each movement of said camera lens by a predetermined driving amount;

interval detecting means for detecting intervals between successive position signals, and for generating interval detection signals having respective values indicating the duration of said intervals; and determining means for computing a value equal to the summation of each position signal value multiplied by a corresponding interval signal value for all position signals generated during said period of charge storage, divided by said period of charge storage, and for determining an equivalent position of said camera lens during said period of charge storage, said equivalent position corresponding to said computed value;

said computing means correcting said defocus amount so as to account for an amount of movement of said camera lens from a point in time when said camera lens comes to said equivalent position to a point in time when said determining means determines said equivalent position, the corrected defocus amount being used in controlling said drive means.

2. A system according to claim 1, wherein said position signal generating means includes an encoder for generating feedback pulses according to movement of said camera lens and a counter for counting the feedback pulses, and said computing means computes a pulse number Ps2 corresponding to an amount of defocus according to the following equations:

$$Pm = \Sigma Pn \cdot tn / T,$$

$$Ps2 = Ps1 - (Pc - Pm)$$

where,
T: charge storage time
tn: n-th pulse period of encoder
Pn: pulse count value of counter corresponding to lens position
Pm: pulse count value of counter corresponding to equivalent position (mean lens position for total quantity of light stored in charge storage sensor)
Pc: pulse count value at point in time when equivalent position is determined by said determining means (lens position immediately before start of next charge storage period)

Ps1: value obtained through converting amount of defocus corresponding to photoelectric signal into pulse number.

3. A system according to claim 1, wherein said computing means computes a first defocus amount including said amount of movement of said camera lens and computes a second defocus amount not including said amount of movement of said camera lens.

4. A system according to claim 3, wherein said computing means converts said first defocus amount into a number corresponding to a number of position signals and computes a number of position signals corresponding to said equivalent position.

5. A system according to claim 4, wherein said computing means computes a number of position signals corresponding to said second defocus amount on the basis of the number of position signals corresponding to said first defocus amount and the number of position signals corresponding to said equivalent position.

6. A focusing control system for a camera lens, comprising:

charge storage type light receiving means for receiving light from an object through said camera lens, and for generating a photoelectric signal according to an intensity distribution of the light received during a period of charge storage;

computing means operative after the period of charge storage of said light receiving means is over for computing a first defocus amount based on said photoelectric signal and representing a positional relation between an image of the object by said camera lens and predetermined plane;

controlling means for operating said light receiving means and said computing means repeatedly;

driving means for driving said camera lens during at least a part of the period of charge storage of said light receiving means;

means for generating a position signal having a value indicating a position of said camera lens with each movement of said camera lens by a predetermined driving amount;

interval detecting means for detecting intervals between successive position signals, and for generating interval detection signals having respective values indicating the duration of said intervals; and determining means for computing a value equal to the sum total of each position signal value multiplied by a corresponding interval detection signal value for all position signals generated during said period of charge storage, divided by said period of charge storage, and for determining an equivalent position of said camera lens during said period of charge storage on the basis of said computed value;

said computing means computing on the basis of said first defocus amount and said computed value a second defocus amount which accounts for an amount of movement of said camera lens from said equivalent position to a position of said camera lens at a time said equivalent position is determined and which is used in controlling said drive means.

7. A focusing control system for a camera lens, comprising:

charge storage type light receiving means for receiving light from an object through said camera lens, and for generating a photoelectric signal according to an intensity distribution of the light received during a period of charge storage by said light receiving means;

computing means operative after said charge storage period is over for computing a defocus amount according to said photoelectric signal;

controlling means for operating said light receiving means and said computing means repeatedly;

driving means for driving said camera lens during charge storage by said light receiving means; and means for determining a correction factor for correcting said defocus amount to account for variation in driven speed of said camera lens during said charge storage period;

said computing means applying said correction factor to said defocus amount to obtain a corrected defocus amount for controlling said driving means during subsequent charge storage by said light receiving means.

8. A system according to claim 7, wherein said correction factor is based on a time-weighted means position of said camera lens during said charge storage period.

9. A system according to claim 8, wherein said correction factor is based on an amount of movement of said camera lens from said time-weighted means position to a position just prior to a next charge storage period.

10. A system according to claim 9, further comprising means for generating position signals representing movements of said camera lens by a predetermined amount and interval detecting means for detecting intervals between successive position signals and for generating interval detection signals representing durations of said intervals, and wherein said time-weighted mean position is determined based on position signals generated during said charge storage period and corresponding interval detection signals.

11. A system according to claim 10, wherein said determining means multiplies a value of each position signal by a value of the corresponding interval detection signal for each position signal generated during said charge storage period and sums the results.

12. A system according to claim 4, wherein said determining means divides said sum by the duration of said charge storage period.

13. A system according to claim 4, wherein said computing means computes a number of position signals corresponding to said defocus amount and a second number of position signals based on said sum, and corrects said first number by an amount based on said second number.

14. A system according to claim 13, wherein said computing means computes a third number of position signals corresponding to a position of said camera lens just prior to a next charge storage period, and corrects said first number of position signals by a difference between said second number of position signals and said third number of position signals.

* * * * *